July 14, 1959 C. E. LOMAX 2,895,008

TELEPHONE SYSTEM SERVING BOTH REGULAR AND PAYSTATION TELEPHONES

Filed June 10, 1955 4 Sheets-Sheet 1

INVENTOR.
CLARENCE E. LOMAX
BY Wm. Walter Owen
ATTY.

July 14, 1959 C. E. LOMAX 2,895,008

TELEPHONE SYSTEM SERVING BOTH REGULAR AND PAYSTATION TELEPHONES

Filed June 10, 1955 4 Sheets-Sheet 2

SELECTOR

INVENTOR.
CLARENCE E. LOMAX

BY Mc Watters Owen

ATTY.

July 14, 1959 C. E. LOMAX 2,895,008

TELEPHONE SYSTEM SERVING BOTH REGULAR AND PAYSTATION TELEPHONES

Filed June 10, 1955 4 Sheets-Sheet 3

SELECTOR

INVENTOR.
CLARENCE E. LOMAX
BY Wm. Watts Owen.
ATTY.

July 14, 1959 | C. E. LOMAX | 2,895,008

TELEPHONE SYSTEM SERVING BOTH REGULAR AND PAYSTATION TELEPHONES

Filed June 10, 1955 | 4 Sheets-Sheet 4

INVENTOR.
CLARENCE E. LOMAX

BY Wm. Walter Owen.

ATTY.

United States Patent Office 2,895,008

Patented July 14, 1959

2,895,008

TELEPHONE SYSTEM SERVING BOTH REGULAR AND PAYSTATION TELEPHONES

Clarence E. Lomax, Chicago, Ill., assignor to General Telephone Laboratories, Incorporated, a corporation of Delaware Application June 10, 1955, Serial No. 514,647

9 Claims. (Cl. 179—6.3)

This invention relates in general to telephone systems serving both regular and paystation telephones and more particularly to the equipment providing such service and being common thereto.

It is a main object of the invention to provide an improved telephone system wherein the circuit arrangement is such that regular and paystation telephones are served in a reliable, efficient and economical manner.

Another object of the invention is the provision of an improved finder-selector link adaptable for use in the system to serve both the regular and paystation telephones.

A further object of the invention is the provision of an improved combined line and recording (CLR) trunk adaptable for use with the above-mentioned link.

In accordance with the above-mentioned objects, a feature of the invention resides in the inclusion of a differential relay connected in series with the line conductors of the selector, with this relay being operated in case the line is unbalanced before a particular connection is completed, whereby said relay subsequently causes the release of said particular connection.

Another feature relates to the above-mentioned differential relay being shunted to prevent its operation in case battery is reversed over the particular connection.

A further feature relates to the above-mentioned differential relay being rendered unresponsive so that it cannot cause the release of the connection when the line is unbalanced, in case the connection is of a different nature and battery is not reversed over this connection.

Still another feature relates to the provision of means whereby the transmitter current of the paystation is automatically increased, at the time that the paystation is placed in the collect position by shunting the above-mentioned differential relay, shunting a polarized relay in the selector and also shunting a polarized magnet in the paystation.

Another feature relates to the provision of means whereby said above-mentioned differential relay is immediately shunted when a call originates from a particular type of line and is not immediately shunted when a call originates from a different type of line.

A further feature relates to the provision of means in the CLR trunk rendered effective in one case by a marking received from the selector, when a particular type of line is calling, for causing a visual means at the CLR operator's position to react with a particular visual indication indicative of the particular type of calling line; and rendered ineffective in another case due to the absence of the marking, when a different type of line is calling, for causing the same visual means at the CLR operator's position to react with a different particular visual indication indicative of the said different type of calling line.

Another feature relates to the provision of means in the CLR trunk for causing a second visual means at the CLR operator's position to react in case said above-mentioned particular type of line is calling, and not to react in case said different type of line is calling.

Still another feature relates to said second visual means being used by said CLR operator to indicate if a calling paystation is in the collect or refund position.

These and other objects and features of the invention will become apparent upon a further perusal of the specification and claims taken in conjunction with the accompanying drawings comprising Figs. 1–5, inclusive, which show by means of the usual diagrams a sufficient amount of the apparatus to enable the invention to be described and understood and in which:

Fig. 1 discloses a schematic representation of the circuit of a prepay telephone paystation; a block diagram representing a regular subscriber; block diagrams representing line circuits individual to the paystation and regular subscriber and a single block diagram representing a finder common to both the paystation and regular subscriber.

In its preferred form, such as disclosed in the present application a brief description of the invention will now be given.

Figure 1:
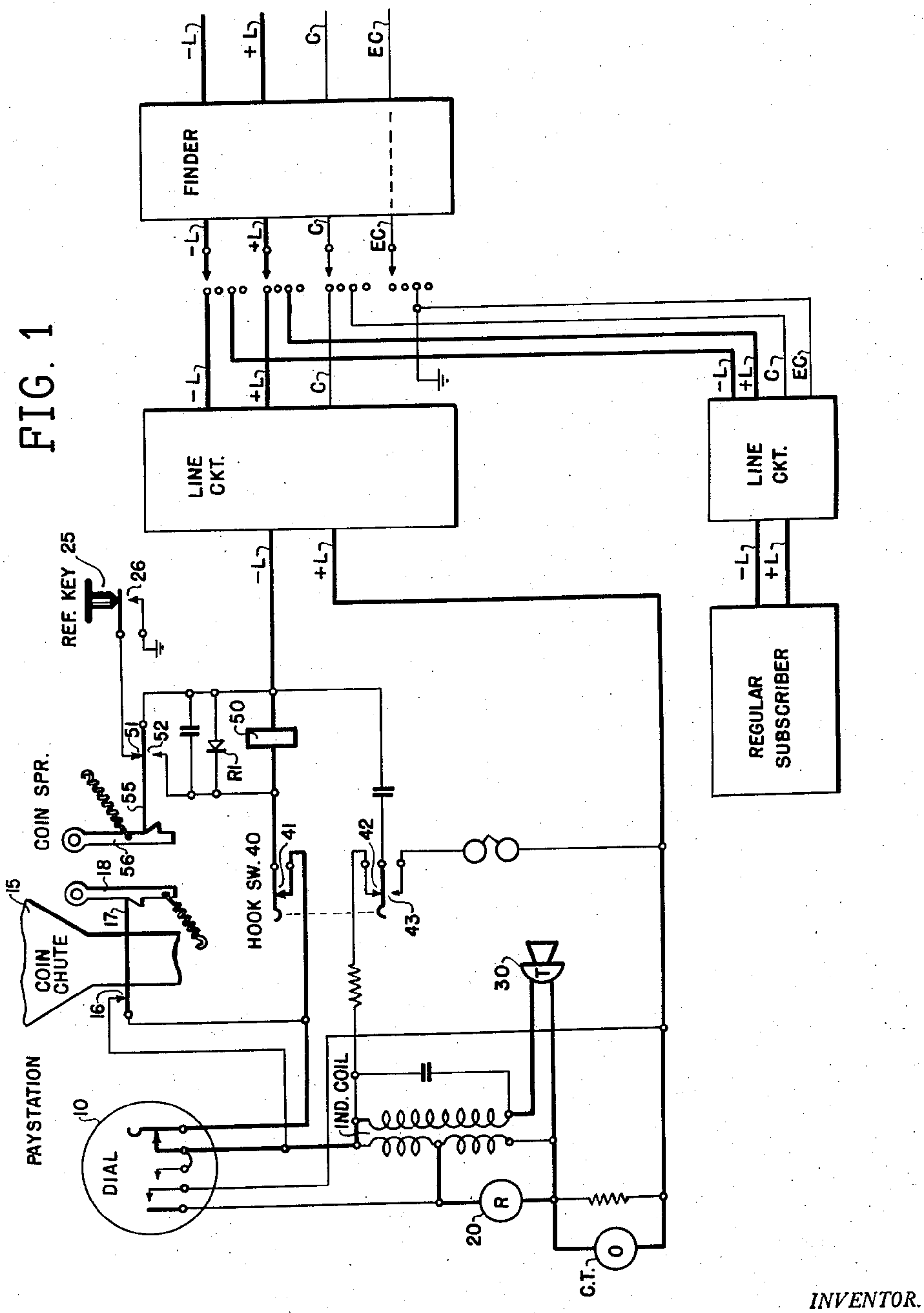

Referring in particular to the part of Fig. 1 showing the circuit arrangement of the paystation, it will be noted that this circuit is a modification of the paystation circuit disclosed in the copending application filed May 31, 1951, Serial No. 229,051 by Clarence E. Lomax, now U.S. Patent 2,750,447, issued June 12, 1956. Further it will also be noted that the type of mechanism used with this particular circuit arrangement is a modification of the paystation mechanism disclosed in the copending application filed December 5, 1951, Serial No. 259,961 by Hans Sengebusch, now U.S. Patent 2,735,891, issued February 21, 1956.

Figure 3:
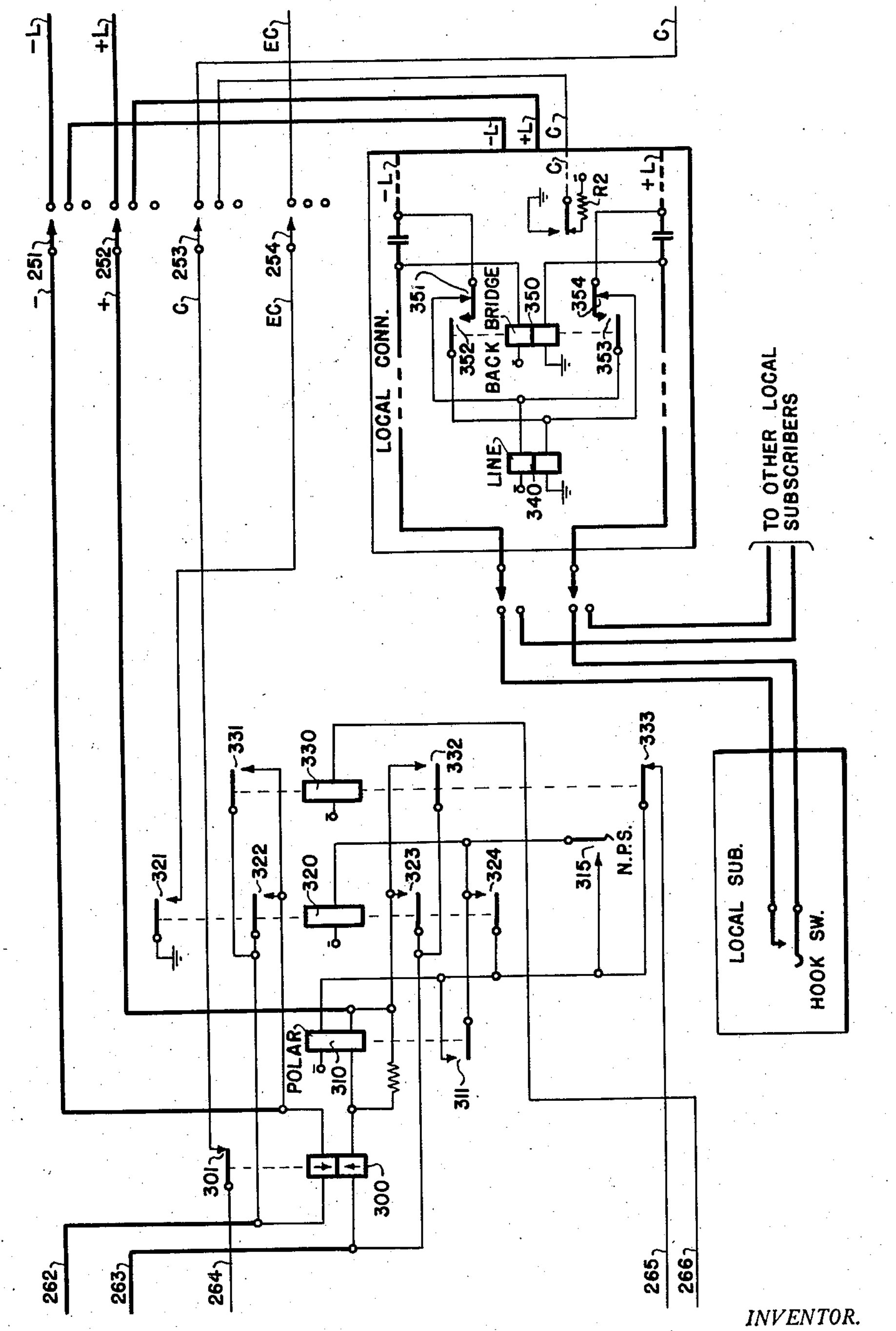
Fig. 3 shows in schematic form, the remainder of the improved selector circuit and block diagrams representing a local connector and a local subscriber.

Referring to the block diagram representing the local connector shown in Fig. 3 of the instant disclosure, it will be noted that this connector may be of any well-known type adaptable for use with a telephone system where the paystations included therein require reverse battery application for proper operation. Only the line and back-bridge relays have been shown in applicant's block diagram, however, reference may be had to United States Patent No. 1,889,229 granted November 29, 1932, to V. S. Tharp for a more detailed operational description.

Briefly, the aforementioned Sengebusch application operates in the following manner:

The coin chute, trigger and hopper are of the conventional type, while the coin trap is operated by a lever instead of the polarized magnets as before. The dial pulsing springs are normally shunted by contacts controlled by the coin trigger and it is only after the coin trigger is operated by a deposited coin, or coins, to open these contacts that the shunt is removed in order that the calling party may operate the dial for extending the desired connection. The deposited coin is arrested and held in the hopper (not shown) by the coin trap until either the call is abandoned or answered. In case the call is abandoned, and the connection is released, the refund (push) key is manually operated to move the above-mentioned lever in one direction and refund the deposit. If the call is answered, reverse battery is applied to the connection by the connector of the called party to operate the coin magnet, which was previously polarized due to a rectifier shunt, to cause its armature to lock and allow only movement of the lever in the opposite direction. The refund key is rendered ineffective and at the completion of the call, the replacing of the handset on the hookswitch operates a linkage which moves the lever in the opposite direction to collect the deposit.

Figure 2:
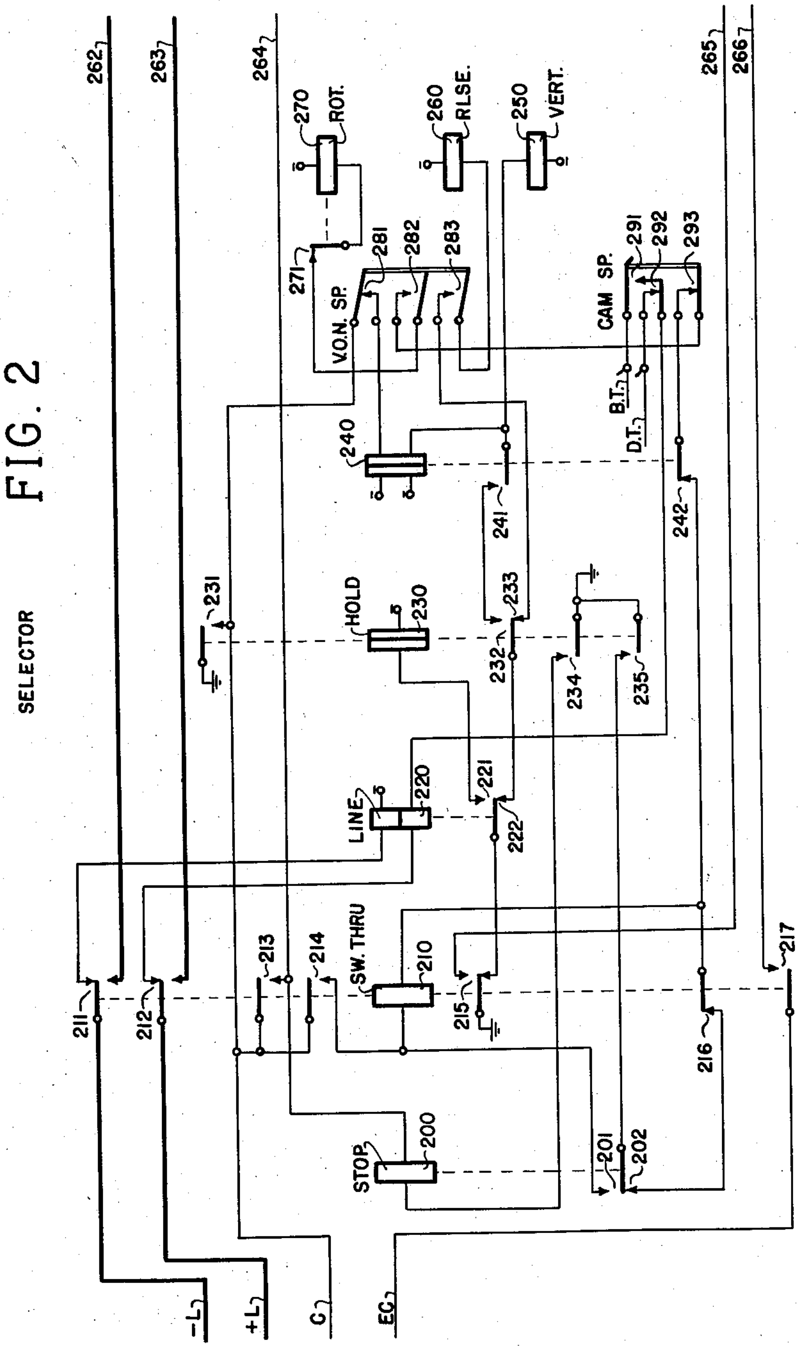
Fig. 2 shows in schematic form, a part of the improved selector circuit.

The improved selector disclosed in Figs. 2 and 3 is primarily intended for use as a first selector and is more commonly known as battery searching selector, in which a stopping relay is used to test for battery on an idle trunk. When battery is located the stopping relay operates to open the rotary magnet circuit of the selector and completes a circuit for the switch-through relay. As the switch-through relay is connected in series with the rotary magnet by way of the rotary interrupter springs, the operation of the switch-through relay is momentarily delayed to prevent its immediate operation in case the wipers overthrow the contact to which they were stepped. A differential relay having its windings connected in series with the line conductors of the selector is operated, only when the line is unbalanced, to cause the release of the present connection. At other times the differential relay is shunted in order to prevent it from releasing the connection. The selector is arranged to serve both regular and paystation lines on either local or toll calls. Regular lines, when calling, forward ground to the selector over the extra control (EC) conductor from the finder; and paystation lines, when calling, do not provide this ground potential on the EC conductor. A subscriber discriminating relay is provided in the selector and is either operated or not, depending upon the condition of the EC conductor with respect to the type of calling line. A subscriber identification relay is provided in the selector for controlling the application of a ground potential to the EC conductor leading from the selector to the CLR trunk. The condition of the discriminating relay controls the condition of the identification relay in the manner that should a regular line be calling, the discriminating relay is operated from the ground potential received over the finder EC conductor and in turn opens the energizing circuit of the identification relay in order to prevent the forwarding of the ground to the CLR trunk over the selector EC conductor. When a paystation is calling, the discriminating relay is not operated, thus the circuit of the identification relay is unaltered and finally completed over normal post springs that close when the selector steps to the proper level and connects with the CLR trunk. In operating, the identification relay sends the ground forward over the selector EC conductor to the CLR trunk, where this ground causes a particular visual indication at the CLR operator's position to inform the operator that a paystation is calling. Calls to local subscribers, rather than toll calls, are handled in a normal procedure.

Figure 4:
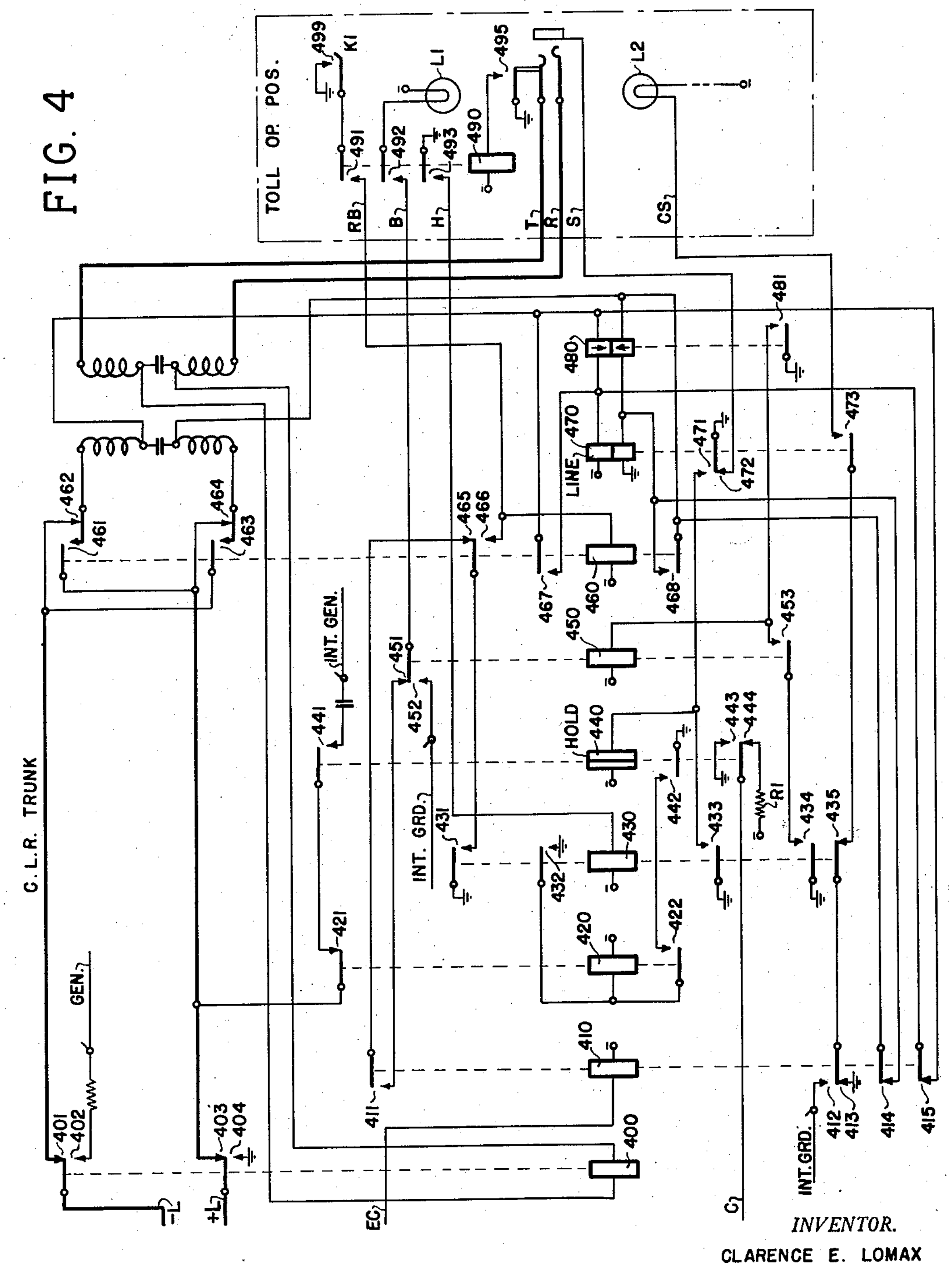
Fig. 4 shows in schematic form, the improved CLR trunk terminating in jacks and accessible by a CLR operator.

The improved CLR trunk disclosed in Fig. 4 is arranged to serve both regular lines and paystation lines and terminates at a CLR operator's position. At the time that the trunk is seized, a relay is either operated or not, depending upon whether or not ground is forwarded to the trunk over the selector EC conductor. If a paystation is calling, the selector EC conductor is grounded and the above-mentioned relay is operated to subsequently connect an intermittently grounded circuit to a lamp at the operator's position. This lamp is flashed due to the intermittent ground to indicate to the operator that a paystation is calling. If a regular subscriber is calling, the selector EC conductor is not grounded and the above-mentioned relay is not operated. In its unoperated condition, the above-mentioned relay allows a steady ground potential to be connected to the same lamp. This lamp now burns steadily and thus indicates to the operator that a regular line is calling.

A more detailed description of the invention will now follow.

Figure 5:
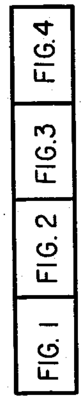
Fig. 5 is a diagram showing how the different sheets of the drawings should be arranged to properly illustrate the system.

Referring to the drawings represented by Figs. 1–4 arranged as shown in Fig. 5, it will be noted that a paystation line and a regular line are served by the same finder and selector when making calls to a local subscriber; additionally, the same CLR trunk serves these lines when a toll call is made. In the ensuing detailed operational description, four different types of calls will be described, hence it is thought best to list each of them under separate headings relating to each particular type of call. These headings will be entitled namely: "Paystation Line to Local Subscriber," "Paystation Line to CLR Operator," "Regular Line to Local Subscriber" and "Regular Line to CLR Operator." The first of these types of calls will now be described.

*Paystation line to local subscriber*

In the ensuing operational description of the above-named type of call, it will be appreciated that the calling party is using a paystation such as disclosed in Fig. 1 and will call a local subscriber such as represented in block diagram and shown in the lower left hand portion of Fig. 3.

Referring in particular to Figs. 1, 2 and 3, it will be assumed that the calling party at the paystation has just removed his receiver, whereby contacts 41 and 42 of hook switch 40 are closed to complete the paystation loop circuit over an obvious path from the line relay (not shown) in the line circuit. This line relay starts the finder in a well-known manner to cause it to hunt for and seize the line of the calling paystation. Dial tone is now placed on the +L line conductor and may be traced from dial tone generator D.T. through cam contact 292, lower winding of the selector line relay 220, break contact of armature 212 to the +L line conductor and hence to the calling paystation. Upon hearing this dial tone, the calling party at the paystation is thus informed that the finder-link is in condition for him to first deposit the required fee. The receipt of this dial tone is also an indication to the calling party that subsequent to the deposit of the required coin, or coins, he may then dial the call number of the desired local subscriber.

Before continuing further with this description, it is thought best to point out that the drawings show the wipers of the finder as being engageable with contacts terminating the conductors from the line circuit of the paystation. It is thus noted that in this case the finder EC wiper is engaged with a contact having no potential connected thereto, and it is only when a regular or non-paystation line is calling that the finder EC wiper will engage a contact to which a ground potential has been connected.

When the finder connects with the calling line, a circuit is completed for operating line relay 220 of the selector over a path traced from ground at the dial tone generator D.T., contacts 292, lower winding of relay 220, break contacts of armature 212, the +L line conductor and through the finder of line circuit, the obvious loop circuit at the paystation completed by contacts 41 and 42 of hook switch 40, rectifier R1, —L line conductor, through the line circuit and finder, break contact of armature 211 and through the upper winding of relay 220 to battery. The current flow through the above traced circuit is such that coin magnet 50 is polarized due to the effect of the shunting rectifier R1, and as such, coin magnet 50 does not operate over the above circuit as long as this current flow is in the present direction.

In operating contacts 221, line relay 220 completes an obvious circuit for hold relay 230 from ground at the break contact of armature 215. In operating, hold relay 230 completes an obvious circuit for the upper winding of relay 240 from ground at contacts 231. At contacts 232 and 233 a point in the pulsing circuit of the vertical magnet 250 is prepared and a point in the operating circuit of the release magnet 260 is opened, respectively. At contacts 234, a point in the operating circuit of stop relay 200 is prepared and at contacts 235 a point in the operating circuit of switch-through relay 210 and rotary magnet 270 is prepared.

At contacts 241, relay 240 prepares another point in the pulsing circuit to vertical magnet 250 and also prepares a future holding circuit for itself, and at contacts 242 a point in the operating circuit of rotary magnet 270 is opened.

The first digit of the call number of the desired local subscriber may now be dialled, with line relay 220 responding to the opening and closing of the pulsing contacts of dial 10 in a well-known manner. Line relay 220 thus releases and reoperates to open and close contacts 222 a number of times corresponding to this first dialled digit. Hence, each time that contact 222 is closed an obvious circuit is completed for vertical magnet 250 from ground at the break contact of armature 215. Thus the selector wipers 251 through 254 are stepped in the vertical direction a number of steps, or levels, corresponding to the digit dialled.

On the first vertical step of the selector wipers, the vertical off-normal (VON) springs are operated to open contacts 281 and close contacts 282 and 283. Contacts 281 open the previously mentioned operating circuit of relay 240, but this relay is held energized during pulsing by means of its hold contacts 241 and its slow-to-release characteristics. Contacts 282 prepare a point in the future energizing circuit of rotary magnet 270 and contacts 283 prepare a point in the future energizing circuit of release magnet 260.

At the end of pulsing in accordance with the first dialled digit, line relay 220 and hold relay 230 remain energized and since contacts 281 of the VON springs are openend, relay 240 will shortly release. It will be assumed that responsive to the vertical stepping, wipers 251 through 254 of the selector are now standing opposite the level of bank contacts to which the conductors of certain local connectors are connected. In restoring, relay 240 opens a point in its former holding circuit at contacts 241 and completes an operating circuit for rotary magnet 270 at contacts 242. This circuit for rotary magnet 270 extends from ground through contacts 235, contacts 202, 216, 242, 293, 282, 271 and through the winding of magnet 270 to battery. This circuit of rotary magnet 270 is alternately opened and closed by its self-interrupter contacts 271 in a well-known manner, thereby causing wipers 251 through 254 to step horizontally around the previously selected level of bank contacts. This rotary hunting action continues until wiper 253 of the selector control (C) conductor engages a bank contact terminating the C conductor of a local connector upon which a battery potential is impressed. The presence of this battery potential on the connector C conductor serves to indicate that this connector is in an idle condition. The presence of a ground potential on a connector C conductor is an indication that that connector is busy.

In this description, it will first be assumed that all of the local connectors connected to the particular bank contact level are busy. Therefore, as the selector wipers are stepped to the last bank contact the cam springs are operated to close contacts 291 and open contacts 292 and 293. The closing of contacts 291 and the opening of contacts 292 applies busy tone and removes dial tone respectively, from the +L line conductor and contacts 293 open the circuit of rotary magnet 270. Upon receipt of busy tone, the calling party at the paystation may replace his receiver on hook switch 40 and thereby open the aforementioned loop circuit. The calling party can refund his coin by manually operating his refund push key 25. Line relay 220 restores responsive to the loop circuit being opened and at contacts 221 and 222 opens the circuit to the hold relay 230 and prepares a point in the energizing circuit of release magnet 260 respectively. Due to its slow-to-release characteristics, hold relay 230 restores after an interval of time and at contacts 233 completes an obvious circuit to the release magnet 260. In operating, release magnet 260 restores wipers 251 through 254 to normal in a well-known manner, thereby restoring the VON springs and cam springs to normal. The finder-selector link is now completely restored.

For a different condition of operation, it will now be assumed that one of the local connectors connected to the bank contact level is idle. Therefore as the selector wipers are stepped into engagement with the bank contacts associated with this idle connector, the aforementioned battery potential encountered by wiper 253 on the connector C conductor completes a circuit for the stop relay 200. This circuit may be traced as extending from ground through contacts 234, winding of stop relay 200, C conductor 264, contacts 301, wiper 253 and engaged contact, the C conductor to the local connector and through high resistance R2 to battery. Stop relay 200 operates extremely fast and at contacts 201 and 202 prepares a point in the operating circuit of switch-through relay 210 and opens the previously traced operating circuit of rotary magnet 270 respectively. Since rotary magnet 270 has been operating as previously described and as it now restores its interrupter contacts 271, a circuit is completed for switch-through relay 210 in series with itself. However, the resistance of the winding of rotary magnet 270 is such that only switch-through relay 210 operates. This circuit for switch-through relay 210 may be traced from ground through contacts 235, contacts 201, winding of relay 210, contacts 242, 293, 382, 271 and through the winding of magnet 270 to battery.

In operating, switch-through relay 210 further extends the connection of the talking conductors through the selector and into the local connector by means of the make contacts at armatures 211 and 212. At contacts 213 an obvious shunting circuit is completed for the stop relay 200 from ground on the C conductor. At contacts 214, switch-through relay 210 completes an obvious holding circuit for itself from the grounded C conductor. At the break and make contacts of armature 215, ground is removed from the operating circuit of release magnet 260 and an energizing circuit for the upper winding of the selector polar relay 310 is completed respectively. At contacts 216 a point in the original energizing circuit of rotary magnet 270 is opened while the closing of contacts 217 have no effect on the circuits at this time. Stop relay 200, line relay 220 and hold relay 230 all restore subsequent to the operation of switch-through relay 210 with no apparent effect on the circuits at this time. Due to its inherent characteristics, polar relay 310 does not operate at the present.

Line relay 340 of the local connector is now maintained operated over the aforementioned loop circuit, and as such, provides battery potential to the established connection in an obvious manner. A hold relay (not shown) in the connector is operated by line relay 340 to remove the aforementioned battery potential from the connector C conductor and apply a ground potential to this conductor for busying the connector to other selectors during the time that the present call is in effect.

The remaining digits of the desired local subscriber's call number are now dialled, with line relay 340 responding to the received pulses for causing the connector to operate and establish an effective signalling connection with the desired local subscriber in a well-known manner.

After a reasonable length of time it is assumed that the called local subscriber answers the call by removing his handset from the hook switch; at which time the hook switch contacts close to complete a loop circuit for operating the connector back-bridge relay 350 in a well-known manner. Back-bridge relay 350 operates to open its contacts 351 and 354 and close its contacts 352 and 353, whereby the battery potential from line relay 340 is now reversed to the +L and −L talking conductors, It will thus be noted that the direction of current flow through the lower winding of electro-polar relay 310 is reversed, with this relay operating in response thereto.

At contacts 311, polar relay 310 completes an operating circuit for relay 320 over a path traced from ground at contacts 215, conductor 265, contacts 333, 311 and through the winding of relay 320 to battery. In operating contacts 322 and 323, relay 320 completes obvious circuits for shunting both windings of differential relay 300 and the lower winding of polar relay 310. At contacts 321 no useful function is presented at this time, while at contacts 324 relay 320 completes a locking circuit for itself to the ground at contacts 215. The shunting of both windings of differential relay 300 serves two purposes, with one purpose being to prevent relay 300 from reducing the current flow in the established connection after the call has been answered and the other purpose being to prevent a release of the connection if the line is unbalanced by being grounded during an attempted refund. This latter purpose will be described more in detail later on in the present description.

At the time that the called party answers the call, and reverse battery is placed on the line, rectifier R1 at the paystation is rendered non-conductive and coin magnet 50 is no longer polarized and therefore operates. Coin magnet 50 operates its armature 55, with this armature locking in its operated position by engaging the notch provided on the locking element 56. Contacts 51 are opened so that it is impossible to ground the line if a refund is attempted. The operation of coin magnet 50 also operates mechanism (not shown) whereby it is impossible for the paystation user to refund his deposited coin. At contacts 52, the winding of coin magnet 50 is shunted to release this magnet and thus cause it to be removed from the talking connection to maintain better transmitter efficiency. However, armature 55 remains locked in its operated condition as above described.

Conversation between the calling paystation and called local subscriber may now take place, with line relay 340 of the connector supplying talking battery for the paystation and back-bridge relay 350 of the connection supplying talking battery for the local subscriber.

Before continuing to the next operational description, it is thought best to describe the function of differential relay 300 during the present type of call. Assuming in one case that the paystation user has made the necessary deposit and that he has dialled the first digit of the local subscriber's call number, in which the selector has connected with the local connector and the switch-through relay 210 has operated. At this time, should the calling paystation user decide to abandon the call or perhaps fraudulently try to obtain a free call by operating his refund key 25, the operation of this key closes contacts 26 and at the same time causes the deposit to be refunded and also repositions coin trigger 17 and reapplies the dial shunt by closing contacts 16. The closing of contacts 26 momentarily applies a direct ground potential to the —L and +L line conductors, thereby temporarily unbalancing the line and the current strength through the windings of relay 300. Differential relay 300 operates responsive to this unbalanced condition and remains so during this temporary period and at contacts 301 opens the selector C conductor to remove the aforementioned holding circuit of switch-through relay 210. Switch-through relay 210 thereby restores and causes the selector to release the local connector and restore to the operated condition previously described, at a point where the calling paystation user had just received dial tone. At this point, the calling paystation may replace his receiver on the hook switch, whereby the finder and selector will restore in a well-known manner, or he may deposit the required fee and initiate another call. If the calling party at the paystation should decide to refund his deposit for similar reasons as mentioned above, but at a different point in the progress of the extension of the connection, namely where the called subscriber is being signalled and has not yet answered. The unbalancing of the line by refund key 25 in this case will cause an occurrance of similar operations such as described above. However, as previously described, if the called subscriber has answered to cause the operation of coin magnet 50 and the windings of differential relay 300 also are shunted, the deposit can not be refunded and the unbalancing of the line conductors can not be accomplished by operating refund key 25.

At the end of conversation and responsive to the calling and called parties replacing their receivers, the equipment is restored in a well-known manner and conditioned to handle future calls.

*Paystation line to CLR operator*

For the above-mentioned type of call, it will be appreciated that the calling party is using a paystation such as disclosed in Fig. 1 and that he intends to place a call of the type requiring the services of a CLR, or toll, operator to complete the extension of the call. This operator has access to the toll operator's position such as shown in the dotted rectangle at the right hand side of Fig. 4 and which is individual to the disclosed CLR trunk.

Reference will be had to Figs. 1 through 4 in describing the above-named type of call. It will be noted that the same equipment is taken into use and the same operations take place as described in the operational description of the section entitled "Paystation Line to Local Subscriber" up to and including the point in the description where the first digit of the call number was dialled.

At this time it is thought advisable to explain that all CLR trunks such as disclosed in Fig. 4 are connected to the bank contacts located in one particular level or plurality of levels adjacent to one another, and accessible thereto by the selector wipers such as 251 through 254. In this particular case, and for one method of illustration, it is assumed that these CLR trunks are connected to the tenth or "0" contact bank level and that they are accessible to the selector responsive to the calling party dialling the single digit "0." Therefore, the selector is stepped to the tenth vertical contact bank level and subsequently starts its rotary hunting around that level in the same manner such as described in the previous section.

The selector continues the rotary hunting action until the C wiper 253 engages a contact terminating the C conductor of an idle CLR trunk, whereby the battery potential impressed thereon causes the stop relay 200 to operate as previously described for seizing the trunk. If the selector upon searching the contact bank finds all CLR trunks busy, it will then operate the cam springs after engaging the last busy contact to stop the rotary action and cause busy tone to be applied to the calling paystation in the same manner as previously described. The normal post springs (NPS) are so arranged that they cause contacts 315 to close responsive to the selector wipers being stepped to the tenth vertical level. The closing of contacts 315 prepares a point in the operating circuit of relay 320.

It will be appreciated in this case that the CLR trunk such as shown in Fig. 4 is assumed to be idle. Therefore, as the C wiper 253 engages the contact terminating the C conductor of this trunk, a circuit is completed for the stop relay 200. This circuit may be traced as extending from ground through contacts 234, the winding of stop relay 200, C conductor 264, C wiper 253 and engaged bank contact, C conductor of the CLR trunk, contacts 444 and through high resistance R1 to battery.

In operating, stop relay 200 completes the circuit for switch-through relay 210 as previously described. Switch-through relay 210 also functions as previously described, with the exception that as the make contact of armature 215 is closed, a circuit is completed for operating relay 320. This circuit for relay 320 may be traced as extending from ground at armature 215, conductor 265, NPS contacts 315 and through the winding of relay 320 to battery. Further, as switch-through relay 210 closes the make contacts at armatures 211 and 212 for extending the connection of the talking conductors to the CLR trunk, an obvious circuit is completed for operating the trunk line relay 470.

Line relay 470 completes an obvious circuit for the trunk hold relay 440 at contacts 471. At contacts 472 ground is removed from the sleeve of the jack at the operator's position and at contacts 473 a circuit is completed from the steady ground at contacts 413, which will momentarily light the call signalling lamp L2.

In operating contacts 321, relay 320 completes a circuit for relay 410 over a path extending from ground at contacts 321, the selector extra control (EC) conductor, wiper 254 and engaged bank contact, the EC conductor of the CLR trunk and through the winding of relay 410 to battery. At contacts 322, 323 and 324, relay 320 performs the same functions as described before. Thus, differential relay 300 is also shunted during this type of call for serving the two previously mentioned purposes.

In operating contacts 411, relay 410 prepares a point in the circuit for lamp L1 and at contacts 412 and 413 an intermittent ground is applied and the steady ground is removed, respectively, for causing lamp L2 to flash instead of burning steadily. This flashing of lamp L2 is an indication to the operator that she is to answer a call that has originated at a paystation. At contacts 414 and 415, relay 410 removes shunts from the two windings of differential relay 480. Relay 480 does not operate at this time in view of its inherent characteristics.

The hold relay 440 applies interrupted generator over an obvious path to the +L line conductor by means of contacts 441 for providing ring-back tone to the party at the calling paystation. At contacts 442 a point in the future holding circuit of relay 420 is closed, at contacts 443 a ground is applied to the trunk C conductor to hold the preceding equipment and also to busy the CLR trunk to other selectors, and at contacts 444 the battery potential is removed from the trunk C conductor to further prevent seizure of the trunk by other selectors during the present call.

Upon observing that lamp L2 is flashing, the operator plugs into the jack at the operator's position to answer the call, whereby contacts 495 are closed to complete an obvious circuit for operating relay 490. Contacts 491 of relay 490 are operated to prepare a point in the circuit of relay 460, contacts 492 prepares another point in the circuit for lamp L1 and contacts 493 completes an obvious circuit for operating relay 430.

In operating contacts 431, relay 430 completes a circuit for lighting lamp L1, at contacts 432 an obvious circuit is completed for operating relay 420, at contacts 433 an obvious locking circuit is completed for the hold relay 440, at contacts 434 a point in the locking circuit of relay 450 is prepared and at contacts 435 the flashing circuit of lamp L2 is opened for extinguishing this lamp as indication to the operator that the call has been answered. The circuit for lamp L1 may be traced as extending from ground at contacts 431, 465, 411, 451, 492 and through lamp L1 to battery. Lamp L1 burns steadily and thus indicates to the operator that she has answered a paystation call. In operating, relay 420 opens contacts 421 to remove ring-back tone from the line and closes contacts 422 for completing its own locking circuit to ground at contacts 442.

At this stage of the description, the operator requests the party at the calling paystation to refund the deposit he made for dialling. The calling party depresses his refund key 25 to cause the refund as requested. The closing of contacts 26 by refund key 25 momentarily grounds the line to cause it to become temporarily unbalanced as previously described, which thereby causes differential relay 480 to operate during this unbalanced period. Differential relay 480 completes an obvious circuit for relay 450 at contacts 481. Relay 450 opens the steadily grounded circuit to lamp L1 at contacts 451 and applies an interrupted ground to this lamp at contacts 452. At contacts 453, relay 450 locks to ground from contacts 434. This interrupted ground applied to lamp L1 causes it to flash and this flashing thereby informs the operator that the calling party at the paystation has refunded his deposit.

The flashing of lamp L1 is also an indication to the operator that she should momentarily withdraw her plug to effect the removal of interrupted ground from lamp L1. This momentary withdrawal restores relay 490, which opens the circuit to relay 430. Relay 430 restores and opens the holding circuit of relay 450 at contacts 434. In restoring, relay 450 opens the interrupted ground circuit from lamp L1 at contacts 452 and at contacts 451 prepares a point in the aforementioned steady grounded circuit. Upon reinserting her plug, the operator causes reoperation of relay 490, which in turn completes the circuit for reoperating relay 430. Relay 430 thereupon reapplies the steady ground potential at contacts 431 for completing the circuit to lamp L1 to cause it to again burn steadily.

The equipment is now in condition for the operator to establish the toll call, at which time the calling party at the paystation is requested to deposit the proper toll fee. Upon making sure that the connection between the calling and called party is established, the operator then momentarily depresses key K1, which at contacts 499 completes an obvious circuit to relay 460. In operating contacts 461 through 464 inclusive, relay 460 reverses the polarity of battery connections from line relay 470 to the —L and +L line talking conductors. At contacts 465 the circuit of lamp L1 is opened for extinguishing the lamp, while at contacts 466 relay 460 completes an obvious locking circuit for itself from ground at contacts 431. At contacts 467 and 468 relay 460 completes obvious circuits for shunting both windings of differential relay 480 thus providing an increased current flow in the talking connection. The reversal of battery causes polarized relay 50 at the calling paystation to operate in the manner as described before so that the paystation will collect the deposited coins. The extinguishing of lamp L1 serves to indicate to the operator that battery has been reversed to the line and that the paystation is in the collect position.

Conversation may now take place over the established connection, with line relay 470 of the CLR trunk providing talking battery for the calling party and the line relay of the connector (not shown) associated with the called party providing talking battery for the called party.

The release of the illustrated equipment is under direct control of the operator. Namely, if the calling party at the paystation were to replace his receiver at the end of conversation, only line relay 470 would restore and the connection would still be maintained by the hold relay 440 which is energized and locked to contacts 433 of relay 430 and which in turn is maintained energized by the relay 490 being under direct control of the operator's plug.

The above arrangement is necessary in order for the operator to obtain the proper toll charges in case there may be a necessity for a subsequent additional toll deposit. In another case, if the party desired by the calling party is not available at that moment, the calling party may replace his receiver and later be signalled by the operator when the connection is ready. The method of initiating the signalling of the calling party may be in any well-known manner, in which any well-known means under control of the operator is momentarily operated to cause the temporary operation of the recall relay 400. Contacts 401 and 403 are opened by relay 400 to open the line conductors in the CLR trunk with no apparent effect at this time other than to temporarily allow line relay 470 to restore. The closing of contacts 402 and 404 appliesr inging current to the connection in a well-known manner to cause the ringer at the paystation to operate. Recall relay 400 thereby restores and causes the line conductors of CLR trunk to be reconnected to the connection and the subsequent reoperation of line relay 470. The calling party at the paystation removes his receiver to answer the operator's signal and his talking connection with the desired party is consequently established.

Before continuing to the next operational description, it is thought advisable to point out that should the calling party at the paystation decide to abandon the call or refund his deposit at any time prior to the operator plugging in to answer, the unbalancing of the line caused by the operation of his refund key such as 25 will, during this early stage of operation, cause the differential relay such as 300 to operate and effect the release of the connection as previously described. If, during a later stage of the operation, the calling party operates his refund key after the operator has plugged in to answer the call, but before she has operated her key such as K1, the line is caused to be unbalanced as before and this time differential relay 480 will operate to cause the subsequent flashing of lamp L1 to indicate to the operator that the calling party has refunded his deposit.

As previously mentioned, the operator has direct control of releasing the connection. Therefore, when the operator has received a disconnect signal in any well-known manner, responsive to the calling and called parties replacing their receivers and is assured that there are no additional charges, she removes her plug and thus effects the release of relay 430 which in turn opens the locking circuit of hold relay 440. The restoring of relay 440 causes the equipment to release in a well-known manner to thus condition it to handle future calls.

*Regular line to local subscriber*

During the description of the above-mentioned type of call it will be assumed that the calling party is a regular, or non-paystation, subscriber calling from any well-known type of telephone having all the usual and well-known instrumentalities, with such subscriber station being represented in block diagram and shown in the lower part of Fig. 1. It will also be assumed that the called party is a local subscriber such as represented in block diagram and shown in the lower part of Fig. 3.

It will be remembered that the extra control (EC) conductors of only the regular subscriber line circuits have a ground potential impressed thereon. Therefore, as the above-mentioned regular subscriber removes his receiver to initiate a call, the EC wiper of the illustrated common finder-selector link will encounter this ground when the line of the regular subscriber is found and seized.

Reference will be had with Figs. 1, 2 and 3 during the time that the above-named type of call is described and is in progress. It will be noted that the same equipment is taken into use and the same operations take place as covered in the description of the section entitled "Paystation Line to Local Subscriber" up to and including the dialling of the first digit, the rotary hunting of the selector and the consequent operation of the switch-through relay 210 when the selector wipers stop on the bank contacts of the illustrated idle local connector.

Switch-through relay 210 operates as previously described and at contacts 211 through 216 inclusive cause the same operations also as previously described. However, when contacts 217 are closed, a circuit is completed for operating relay 330. This circuit may be traced as extending from the grounded EC conductor of the regular subscriber's line circuit, the EC wiper of the finder and into the selector, contacts 217, conductor 266 and through the winding of relay 330 to battery.

In operating contacts 331 and 332, relay 330 completes obvious circuits for shunting both windings of differential relay 300, thereby accomplishing the purposes previously covered and described during the operation of relay 320. Contacts 332 also shunt the lower winding of polar relay 310, while the energizing circuit of the upper winding of polar relay 310 is opened at contacts 333.

The remaining digits of the desired local subscriber's call number may now be dialled, with line relay 340 of the illustrated local connector responding to the received pulses for causing the connector to operate and establish an effective signalling connection with the desired local subscriber in a well-known manner.

After a reasonable length of time, the called party answers the call, causing the connector to reverse the battery potential to the +L and −L talking conductors as previously described. This reversal of potential may operate equipment (not shown) in the regular subscriber's line circuit, in any well-known manner, for metering the call. Polar relay 310 in the selector is not operated by this battery reversal, due to its winding being shunted from the connection.

Conversation between the calling and called parties may now take place, with line relay 340 and back-bridge relay 350 of the connector supplying talking battery to the parties respectively.

At the end of conversation and responsive to the calling and called parties replacing their receivers, the equipment is restored in a well-known manner and conditioned to handle future calls.

*Regular line to CLR operator*

For the above-mentioned type of call it will be assumed that the calling party is the regular subscriber described in the section entitled "Regular line to local subscriber" and that for this type of call he intends to place a call requiring the services of a CLR, or toll, operator such as described in the section entitled "Paystation Line to CLR operator."

Reference will be had with Figs. 1–4, inclusive, during the time that the above-named type of call is described and is in progress. It will be noted that the same equipment is taken into use and the same operations take place as previously covered in the descriptions of the above-named sections up to and including the dialling of the single first digit 0, wherein the selector hunts for and connects with the idle CLR trunk and the consequent operation of switch-through relay 210.

It will be remembered that when the first digit dialled is 0, for establishing a connection with the toll operator, the selector steps to the tenth contact bank level and as a result causes the operation of normal post springs NPS and the closure of contacts 315 as previously described. Thus, as switch-through relay 210 operates, circuits are completed for relays 320 and 330. However, even if relay 320 were to operate, its circuit would immediately be opened by relay 330 at contacts 333. Therefore, in this case when a regular line is calling, no ground potential is forwarded to the CLR trunk over the EC conductor and relay 410 is not subsequently operated.

Line relay 470 of the CLR trunk operates responsive to the extension of the talking conductors thereto by switch-through relay 210 and causes the same subsequent operations as previously described. However, since relay 410 is not operated during this type of call, a circuit is completed at line relay contacts 473 for causing lamp L2 to burn steadily from the steady ground potential at contacts 413. Since lamp L2 burns steadily, this is an indication to the toll operator that she is to answer a call that has originated at a regular subscriber station. Further, since the call does not involve any actual deposit of money, it is not necessary that the shunting circuits for the windings of the differential relay 480 be opened by relay 410.

Upon observing the steady burning of lamp L2, the operator plugs in to answer and causes the same operations as described before. However the circuit to lamp L1 is maintained opened at contacts 411. It will be noted that it is not possible for lamp L1 to light at any time during this particular type of call. Lamp L2 extinguishes responsive to the answering and thus readily informs the operator that the answering operations have taken place and that she may proceed to the next step in the extension of the call.

The operator now converses with the calling party in order to determine the information necessary to establish the proper connection with the desired party. Upon establishing the desired connection in a well-known manner, the operator may then momentarily close key K1 which causes the operation of relay 460 and the subsequent battery reversal as previously described. This battery reversal may then be used to initiate metering of the call as previously mentioned and also for talking purposes for the calling subscriber.

Conversation may now take place in the usual manner and when it is terminated, the equipment is released and restored to normal as described before.

Having described my invention, what is considered new and desired to have protected by Letters Patent will be pointed out in the appended claims.

What is claimed is:

1. In a telephone system, subscriber lines having stations of a certain character thereon, other subscriber lines having stations of a different character thereon, a finder-selector link having access to lines of all of said stations for extending desired connections, means for connecting said link with calling ones of said lines, a differential relay in said selector and having its windings connected in series with the line conductors of a connection, means at each station on said other lines and operated in case of an attempted fraud by a calling one of said different stations, before a desired connection is completed, for causing the operation of said differential relay, means operated by said differential relay when operated for initiating the release of said desired connection, thereby preventing said fraud, a polarized relay in said selector and having one of its windings connected in series with one of the line conductors of a connection, means operated in case said fraud is not attempted and responsive to the answering of said last-mentioned connection, when completed, for operating said polarized relay, a first discriminating relay in said selector, means operated by said operated polarized relay for operating said first discriminating relay, means operated by said first discriminating relay for shunting said windings of said differential relay and said one winding of said polarized relay from said completed connection to increase the current flow in said completed connection, a marking potential common to only said lines having said certain stations thereon and encountered by said link in case a calling one of said certain stations initiates the extension of a desired connection, means in said selector operated responsive to said extension for forwarding said marking potential to said selector, a second discriminating relay in said selector operated responsive to said forwarded potential, and means operated by said operated second discriminating relay for shunting said windings of said differential relay and said one winding of said polarized relay from said extended connection to increase the current flow in said connection.

2. In a telephone system, a calling paystation line, a finder-selector link having access thereto for extending desired connections, a toll operator's position for completing a desired toll connection, a trunk circuit accessible to said link and terminating at said position, means for connecting said link with said paystation line, a refund key at said paystation, means in said link responsive only in case said paystation operates said key to initiate a refund operation, before said desired toll connection is extended to said trunk, for preventing further extension of said connection, means responsive in case said link is connected with said trunk, and in case said refund operation is not attempted before said desired toll connection is extended to said trunk, for rendering said last-mentioned means unresponsive to subsequent refund operations, means responsive to the said last-mentioned means for extending a particular marking to said trunk, means including a first visual means operated responsive to said marking for indicating at said operator's position that said desired toll connection is to be answered, a differential relay having its windings connected in series with the line conductors of said trunk and normally shunted therefrom, means operated responsive to said last-mentioned means for removing said shunt, a second visual means, relay means including contacts operated responsive to the answering of said connection for restoring said first visual means and for steadily operating said second visual means, thereby indicating respectively that said call has been answered and that said call has originated from said paystation, means operated responsive to the operation of said refund key when an initial deposit is refunded by said paystation for unbalancing the line in said connection, said differential relay operating responsive to said unbalancing, means responsive to said operation of said differential relay for causing said second visual means to intermittently operate as an indication of said refund operation, means at said operator's position for removing said intermittent operation from said second visual means and reapplying said steady operation as an indication that said desired toll connection may be further extended, a relay, means operated subsequent to the completion of said desired toll connection by said operator's position for operating said relay, means operated responsive to the operation of said relay for restoring said second visual means to normal, and other means operated responsive to the operation of said relay for shunting said windings of said differential relay to increase the current flow in said completed toll connection.

3. In a telephone system, a paystation line, a regular subscriber line, a common finder-selector link having access thereto for extending desired connections, a toll operator's position for completing desired toll connections, a trunk circuit accessible to said link and terminating at said position, means for connecting said link with said paystation line when calling, a refund key at said paystation, means controlled responsive to the operation of said refund key by said paystation in case of an attempted refund operation for unbalancing the line conductors in a connection, relay means having windings included in series with said line conductors of said link and operated in case said unbalancing takes place before said call is extended to said trunk for preventing further extension of said call, means responsive in case said link is connected with said trunk, and in case said unbalancing is not attempted before said call is extended to said trunk, for excluding said windings of said relay means from said line conductors to render it unresponsive to subsequent unbalancings, means responsive to said last-mentioned means for extending a particular marking to said trunk as an indication that the call is from a paystation, means for connecting said link with said regular subscriber line when calling, a different marking potential individual to said regular subscriber line and extended to said link responsive to said last-mentioned connection, means in said link responsive to said different marking for excluding said windings of said relay means from said line conductors, said particular marking not being extended to said trunk in this case to thereby indicate that the call is from a calling regular subscriber, visual indicating means at said operator's position, means in said trunk responsive in case said call from said regular subscriber has been extended thereto for causing steady operation of said visual means as an indication to said position that a call from said regular subscriber is awaiting disposition, a relay in said trunk operated responsive to said particular marking in case said call from said paystation has been extended thereto, and means responsive to the operation of said relay for causing intermittent operation of said visual means as an indication to said position that a call from said paystation is awaiting disposition.

4. In a telephone system, called lines, a calling paystation line, a finder-selector link having access thereto for extending desired connections to one of said called lines, means including a pair of line conductors for connecting said link with said paystation line, a manually operable refund key at said paystation, a differential relay in said selector having its windings connected in series with said line conductors of an extended connection, means operated responsive to the operation of said refund key for initiating refund operations at said paystation and for unbalancing said line conductors included in said connection, said differential relay operated responsive to said unbalancing of said line conductors in the event said unbalancing takes place before the completion of said desired connection with said one called line, release means in said selector, and means including contacts controlled by the operation of said differential relay for operating said release means to release said connection to normal.

5. In a telephone system, called lines, a calling paystation line, a finder-selector link having access thereto for extending desired connections to one of said called lines, means including a pair of line conductors for connecting said link with said paystation line, a manually operable refund key at said paystation, a differential relay in said selector having its windings connected in series with said line conductors of an extended connection, means operated responsive to the operation of said refund key for initiating refund operations at said paystation and for unbalancing said line conductors included in said connection, said differential relay operated responsive to said unbalancing of said line conductors in the event said unbalancing takes place before the completion of said desired connection with said one called line, release means in said selector, means including contacts controlled by the operation of said differential relay for operating said release means to release said connection to normal, and means operated in the event said desired connection is completed with said one called line and responsive to the answering thereby for rendering said relay unresponsive to subsequent unbalancings of said line conductors.

6. In a telephone system, called lines, a calling paystation line, a finder-selector link having access thereto for extending desired connections to one of said called lines, means including a pair of line conductors for connecting said link with said paystation line, a manually operable refund key at said paystation, a differential relay in said selector having its windings connected in series with said line conductors of an extended connection, means operated responsive to the operation of said refund key for initiating refund operations at said paystation and for unbalancing said line conductors included in said connection, said differential relay operated responsive to said unbalancing of said line conductors in the event said unbalancing takes place before the completion of said desired connection with said one called line, release means in said selector, means including contacts controlled by the operation of said differential relay for operating said release means to release said connection to normal, means in said selector for shunting the windings of said relay, and means operated in the event said desired connection is completed with said one called line and responsive to the answering thereby for operating said shunting means to render said relay unresponsive to subsequent unbalancings of said line conductors.

7. In a telephone system, called lines, a calling paystation line, a finder-selector link having access thereto for extending desired connections to one of said called lines, means including a pair of line conductors for connecting said link with said paystation line, a differential relay in said selector having its windings connected in series with said line conductors of an extended connection, manual means operated at said paystation for unbalancing said line conductors included in said connection, said differential relay operated responsive to said unbalancing of said line conductors in the event said unbalancing takes place before the completion of said desired connection with said one called line, release means in said selector, means controlled by the operation of said differential relay for operating said release means to release said connection to normal, and means including disabling means operated in the event said desired connection with said one called line is completed and responsive to the answering thereby to exclude the windings of said relay from said series connection for increasing the current flow in said completed connection and for rendering said relay unresponsive to subsequent unbalancings of said line conductors.

8. In a telephone system, called stations, a calling paystation line, a finder-selector link having access thereto for extending desired connections to said called stations, a plurality of contact bank levels accessible to said selector, means including a pair of line conductors for connecting said link with said paystation line, a differential relay in said link having its windings connected in series with said line conductors of an extended connection, operating means for operating said selector in one instance to connect with one of said contact bank levels responsive to a desired particular connection to a certain called station being initiated by said paystation, a manually operable refund key at said paystation, means operated responsive to the operation of said refund key for initiating refund operations at said paystation and for unbalancing said line conductors included in said connection, said differential relay operated responsive to said unbalancing of said line conductors in the event said unbalancing takes place before the completion of said particular connection with said certain called station, release means in said selector, means controlled by the operation of said differential relay for operating said release means to release said particular connection to normal, means for excluding the windings of said differential relay from said series connection with said line conductors, means operated in the event said particular connection is completed with said certain called station and responsive to the answering thereby for operating said excluding means to render said relay unresponsive to subsequent unbalancings of said line conductors, said operating means operating said selector in another instance to connect with a different contact bank level responsive to a different desired connection to a different called station being initiated by said paystation, and means operated responsive to said selector connecting with said different contact bank level and before said different connection with said different called station is completed for operating said excluding means to render said differential relay unresponsive to any unbalancings of said line conductors.

9. In a telephone system, calling subscriber lines of a certain character, other calling subscriber lines of a different character, a called line, a finder-selector link having access to the calling lines of all characters for extending desired connections to said called line, means including a pair of line conductors for connecting said link with one of said calling lines of said different character, a differential relay in said selector having its windings connected in series with said line conductors of extended connections, means for operating said differential relay before said connection to said called line is completed and responsive to an attempted fraud by said calling line of said different character, release means in said selector, means controlled by the operation of said differential relay for operating said release means to release said connection to normal, thereby preventing said fraud, first means for excluding said windings of said differential relay from an extended connection, means operated after the completion of said call between said calling line of said different character and said called line and responsive to the answering thereby for operating said first excluding means to exclude said differential relay windings from said series connection and increase the current flow in said completed calling connection, a marking potential common to only said calling lines of said certain character, said marking potential encountered by said link in the event a calling line of said certain character initiates the extension of a desired connection to said called line, second means for excluding said windings of said differential relay from an extended connection, means in said link operated responsive to receipt of said encountered marking potential for operating said second excluding means to exclude said differential windings from said series connection and increase the current flow in said last-mentioned connection.

References Cited in the file of this patent

UNITED STATES PATENTS

| | | |
|---|---|---|
| 2,367,769 | Goddard | Jan. 23, 1945 |
| 2,655,558 | Kessler | Oct. 13, 1953 |
| 2,700,069 | Pharis | Jan. 18, 1955 |